(12) United States Patent
Schechner et al.

(10) Patent No.: US 8,350,957 B2
(45) Date of Patent: Jan. 8, 2013

(54) IMAGING SYSTEMS AND METHODS FOR RECOVERING OBJECT VISIBILITY

(75) Inventors: Yoav Schechner, Haifa (IL); Tali Treibitz, Beer Yaacov (IL)

(73) Assignee: Technion Research and Development Foundation Ltd., Haifa (IL)

( * ) Notice: Subject to any disclaimer, the term of this patent is extended or adjusted under 35 U.S.C. 154(b) by 608 days.

(21) Appl. No.: 12/227,022

(22) PCT Filed: May 9, 2007

(86) PCT No.: PCT/IL2007/000560
§ 371 (c)(1),
(2), (4) Date: Jun. 8, 2009

(87) PCT Pub. No.: WO2007/129326
PCT Pub. Date: Nov. 15, 2007

(65) Prior Publication Data
US 2009/0295933 A1  Dec. 3, 2009

Related U.S. Application Data

(60) Provisional application No. 60/798,737, filed on May 9, 2006.

(51) Int. Cl.
*H04N 5/222*  (2006.01)
*H04N 7/00*  (2006.01)
*H04N 5/253*  (2006.01)
*G03B 17/08*  (2006.01)

(52) U.S. Cl. ............... 348/370; 348/31; 348/81; 396/28

(58) Field of Classification Search ............ 348/31, 348/81, 122, 335, 362, 371, 370; 356/342; 396/28

See application file for complete search history.

(56) References Cited

U.S. PATENT DOCUMENTS

| | | | |
|---|---|---|---|
| 6,069,565 A | 5/2000 | Stern et al. | |
| 6,348,942 B1 | 2/2002 | Watkins | |
| 6,459,818 B1 * | 10/2002 | George | 382/254 |
| 6,707,761 B2 * | 3/2004 | Erikson | 367/131 |
| 6,775,014 B2 | 8/2004 | Foote et al. | |
| 6,970,578 B1 * | 11/2005 | Strand | 382/103 |
| 7,085,401 B2 | 8/2006 | Averbuch et al. | |
| 7,236,201 B1 * | 6/2007 | Gershenson | 348/370 |
| 7,522,191 B2 * | 4/2009 | Hara et al. | 348/223.1 |
| 7,804,518 B2 * | 9/2010 | Schechner et al. | 348/81 |
| 2003/0214590 A1 * | 11/2003 | Matherson | 348/243 |

\* cited by examiner

*Primary Examiner* — Trung Diep
(74) *Attorney, Agent, or Firm* — The Law Office of Michael E. Kondoudis

(57) ABSTRACT

A system and method are provided for imaging in scattering media such as fog, water and biological tissues. Normally, such images suffer from poor visibility due to backscattering and signal attenuation. At least two images are taken of the scene using active widefield polarized illumination, with different states of a camera-mounted polarizer. The degree of polarization of backscatter is estimated in every point of the scene, leading to an estimation of the backscatter in every point of the scene. A portion or all of the value of backscatter can be deducted in each point of the scene resulting in an enhanced image with improved contrast and brightness range across the field of view.

11 Claims, 19 Drawing Sheets
(17 of 19 Drawing Sheet(s) Filed in Color)

Prior Art

IMAGING SYSTEMS AND METHODS FOR RECOVERING OBJECT VISIBILITY

CROSS REFERENCE TO RELATED APPLICATIONS

This application is a national stage of international application PCT/IL2007/000560, filed 9 May 2007. Additionally, this application claims the benefit of U.S. Provisional Application No. 60/798,737, filed 9 May 2006.

FIELD OF THE INVENTION

The present invention relates to systems and methods for photographing an object and in particular for photographing an object immersed in a scattering medium such as water, fog or biological tissues.

BACKGROUND OF THE INVENTION

1. Scattering Media

A wide range of imaging domains exists in scattering media. Several studies [P. C. Y. Chang, J. C. Flitton, K. I. Hopcraft, E. Jakeman, D. L. Jordan, and J. G. Walker. Improving visibility depth in passive underwater imaging by use of polarization. App. Opt., 42:2794-2803, 2003.; E. Namer and Y. Y. Schechner. Advanced visibility improvement based on polarization filtered images. In Proc. SPIE 5888: Polarization Science and Remote Sensing II, pages 36-45, 2005.; Y. Y. Schechner and N. Karpel. Clear underwater vision. In Proc. IEEE CVPR, volume 1, pages 536-543, 2004.; Y. Y. Schechner, S. G. Narasimhan, and S. K. Nayar. Polarization-based vision through haze. App. Opt., 42:511-525, 2003.; S. Shwartz, E. Namer, and Y. Y. Schechner. Blind haze separation. In Proc. IEEE CVPR, 2006] improved visibility in such media under natural illumination. However, natural light is in general unavailable in relevant scenarios, as in deep water, pipelines, night and biological tissues. Moreover, natural illumination may change in time unpredictably [Y. Y. Schechner and N. Karpel. Attenuating natural flicker patterns. In Proc. MTS/IEEE OCEANS, pages 1262-1268, 2004]. The need to use artificial illumination is therefore obvious. This involves a practical difficulty: the illumination is strongly scattered back towards the camera from particles along the line of sight (LOS), creating backscatter, as shown in FIG. 1. The backscatter overwhelms the signal, causing severe loss of visibility. This problem can be alleviated by increasing the baseline between the light source and the camera [J. S. Jaffe. Computer modelling and the design of optimal underwater imaging systems. IEEE J. Oceanic Eng., 15:101-111, 1990.; B. Skerry and H. Hall. Successful Underwater Photography. New York: Amphoto books, 2002]. However, this is impossible to do in tight environments such as shipwrecks or pipelines. Moreover, a construction using long strobe arms is cumbersome and less hydrodynamic. In any case, backscatter ultimately overcomes the attenuated signal for far enough objects, no matter how far the light source is placed. Backscatter can be modulated and then compensated for in image post-processing. Such current methods require acquisition of long image sequences by structured light [D. M. Kocak and F. M. Caimi. The current art of underwater imaging with a glimpse of the past. MTS Journal, 39:5-26, 2005; M. Levoy, B. Chen, V. Vaish, M. Horowitz, I. McDowall, and M. Bolas. Synthetic aperture confocal imaging. ACM TOG, 23:825-834, 2004; S. G. Narasimhan, S. K. Nayar, B. Sun, and S. J. Koppal. Structured light in scattering media. In Proc. IEEE ICCV, volume 1, pages 420-427, 2005] or time-gating [S. G. Demos and R. R. Alfano. Temporal gating in highly scattering media by the degree of optical polarization. Opt. Letters, 21:161-163, 1996; G. R. Fournier, D. Bonnier, L. J. Forand, and P. W. Pace. Range-gated underwater laser imaging system. Opt. Eng, 32:2185-2190, 1993; Harsdorf, R. Reuter, and S. Tonebon. Contrast-enhanced optical imaging of submersible targets. In Proc. SPIE, volume 3821, pages 378-383, 1999; M. P. Strand. Imaging model for underwater range-gated imaging systems. In Proc. SPIE, volume 1537, pages 151-160, 1991; B. A. Swartz and J. D. Cummings. Laser range-gated underwater imaging including polarization discrimination. In Proc. SPIE., volume 1537, pages 42-56, 1991]. Such sequences may lengthen the overall acquisition time. Moreover, such systems have the drawback of being very complex and expensive.

SUMMARY OF THE INVENTION

To counter the problems, the present invention looks at widefield (not scanning) illumination with a small (or no) baseline, where the backscatter is modulated by polarization. Preliminary studies by others [G. C. Giakos. Active backscattered optical polarimetric imaging of scattered targets. In IEEE Instr. & Measurement Tech. Conf, volume 1, pages 430-432, 2004; G. D. Gilbert and J. C. Pernicka. Improvement of underwater visibility by reduction of backscatter with a circular polarization technique. App. Opt., 6:741-746, 1967; G. D. Lewis, D. L. Jordan, and P. J. Roberts. Backscattering target detection in a turbid medium by polarization discrimination. App. Opt., 38:3937-3944, 1999] indicated that backscatter can be reduced by polarization. However, the present invention goes further. Using post-processing means, it is possible to remove residual backscatter that is not blocked by optical means. Moreover, a rough estimate of the 3D scene structure may be obtained from the acquired frames. The acquisition setup is a simple modification of instruments used routinely in such media: simply mounting two polarizers, one on the light source and another on the camera. The acquisition process is instantaneous, i.e., requiring only two frames, rather than scanning.

The approach is based on several insights into the image formation process. The invention shows that backscatter and attenuation of artificial illumination can be well approximated by simple closed-form parametric expressions. To incorporate polarization, we have performed empirical polarization measurements in real underwater scenes: in a temperate latitude sea (Mediterranean Sea), a tropical sea (the Red Sea), in a murky lake (Sea of Galilee) and a swimming pool.

The present invention thus relates to an imaging method and system for recovering object visibility in a scene containing a scattering medium. The method comprises the following steps:
 (i) illuminating the scene with an active illumination system on which a polarizer is mounted;
 (ii) mounting a polarization analyzer on an image acquisition equipment;
 (iii) acquiring a first frame of the scene;
 (iv) changing the polarization state of the polarizer or of the polarization analyzer or of both;
 (v) acquiring one or more additional frames of the scene;
 (vi) estimating the degree of polarization of backscatter in every point of the scene;
 (vii) estimating the backscatter in every point of the scene based on the analysis performed in (vi); and
 (viii) deducting a portion or all of the value of the backscatter in each point of the scene to receive one or more enhanced images with improved contrast and brightness range across the field of view.

The illumination system can include one or more light sources. The light sources use an active, widefield illumination as opposed to scanning-methods lighting.

In one embodiment of the present invention, the first frame of the scene is acquired with the polarizer or the polarization analyzer in a polarization state with an approximate minimum or low visible backscatter. In another embodiment of the present invention, the one or more additional frames of the scene are acquired with the polarizer or the polarization analyzer in a polarization state with approximately maximum or high visible backscatter. It is not necessary to use the absolute minimum or maximum backscatter value, but using a relatively low amount and a relatively high amount of backscatter can produce good results.

The present invention also compensates for signal attenuation.

In a further embodiment of the present invention, the enhanced image is further combined with one or more images obtained by any method adapted for enhancing images of polarizing objects. Estimating the object's polarization usually assumes that the object returns a fixed polarization value.

The present invention's active illumination system can include at least one of the following for better performance:
(i) a multi-polarized light source composed of a polarized array of light sources so that at least one portion of the light sources are polarized in a different polarization state compared to the polarization state of the remaining light sources, and each frame is acquired using different polarization of the illumination;
(ii) one or more optical filters are attached to a light source with a gap between the light source and the polarizer and analyzer so that the surrounding medium can fill in the gaps, providing natural cooling to the system; and
(iii) devices that convert more than half the energy into polarized light.

Light Emitting Diodes (LED's) are a good example of an available light source, though other lighting means can also be used by the invention.

Examples of optical filters include but are not limited to polarizers, diffusers and the like.

In one embodiment of the present invention, the polarization analyzer is mounted on an imaging sensor comprised of a plurality of pixels, so that the polarization analyzer mounted on one portion of the pixels is in one polarization state. The remaining pixels may have a polarization analyzer mounted, or may be without a polarization analyzer. The polarization analyzer mounted on the remaining pixels of the imaging sensor is in one or more different polarization states. The polarization analyzer is mounted on a plurality of pixels, but not necessarily on all of the pixels. One portion of the pixels, for example, half the pixels, can have the polarization analyzer in one polarization state while the other pixels have a polarization analyzer mounted with a different polarization state.

The active illumination system of the invention can be calibrated for medium and light properties by acquiring one or more calibration frames of the scene wherein at least one calibration frame contains a known object. The known object can be black or a non-black object can also be used.

For example, medium and light properties can be calibrated using the following steps:
(i) acquiring a first calibrating frame of a black object situated in a first distance from an image acquisition equipment;
(ii) acquiring a second calibrating frame of the black object situated in a second distance from the image acquisition equipment;
(iii) acquiring a third calibration frame of an illuminated void region in the scene, with no objects in sight; and
(iv) deriving calibration parameters based on the first, second and third calibration frames.

The derived calibration parameters are useful for estimating the distances between objects in the scene. 3D reconstruction of the scene is most effective in short ranges when light still exists in sufficient intensity and the backscatter has not saturated and still varies rapidly.

In a further embodiment of the present invention, the method estimates and compensates for falloff. Backscatter is related to an object's distance from the camera.

In another aspect of the present invention, an imaging method is provided for calibration of light properties by acquiring one or more calibration frames of a scene wherein at least one calibration frame contains a known object.

In one embodiment of the present invention, an imaging method is provided for calibration of light properties by:
(i) acquiring a first calibrating frame of a known object situated in a first distance from an image acquisition equipment;
(ii) acquiring a second calibrating frame of the known object situated in a second distance from the image acquisition equipment;
(iii) acquiring a third calibration frame of an illuminated void region in the scene, with no objects in sight; and
(iv) deriving calibration parameters based on the first, second and third calibration frames.

Calibration can also be achieved by imaging two different boards in two distinct distances; and deriving calibration parameters based on a-priori known ratio between the albedos of the two different boards.

A third calibration system can be achieved using the polarization technique. Thus in another embodiment of the present invention, an imaging system is proposed, comprising:
(i) means for illuminating the scene with an active illumination system on which a polarizer is mounted;
(ii) means for mounting a polarization analyzer on an image acquisition equipment;
(iii) means for acquiring a first frame of the scene;
(iv) means for changing the polarization state of the polarizer or of the polarization analyzer or of both;
(v) means for acquiring one or more additional frames of the scene;
(vi) means for estimating the degree of polarization of backscatter in every point of the scene; and
(vii) means for estimating the backscatter in every point of the scene based on the analysis performed in (vi).

Preferably, images taken are of a board having all its pixels in the same distance from the image acquisition equipment In another aspect, the invention relates to fusion techniques in order to recover object visibility in a scene containing a scattering medium. In one embodiment, a fusion imaging method is proposed for enhancing object visibility in a scene containing a scattering medium, the method comprising the steps of:
(i) illuminating the scene with an active illumination system and acquiring a first image of the scene;
(ii) acquiring one or more additional images of the scene such that each image is taken with a different illumination of the scene; and
(iii) applying a fusion technique using each image components to obtain an image with enhanced contrast, color and/or visibility.

The present invention can use any fusion technique of the art in order to obtain an enhanced image. For example, one fusion technique comprises the following steps:
(i) decomposing each image into a Gaussian and a Laplacian pyramid;
(ii) creating a new Laplacian pyramid, in which each level is composed of values from the corresponding level in the Laplacian pyramids of all the images; and
(iii) decoding the final image using the new pyramid.

The different illumination of the scene refers to changes in the spatial and/or directional distribution of the illumination of the scene as can be obtained, for example, by changing the position and/or angle of either or both of the illumination system (i.e. flash light) or image acquisition equipment (i.e. camera).

Optionally, the method can also comprise the step of assigning the base level of the Laplacian pyramid a constant value which is the average of all pixel values of all base levels before step (v). Alternatively, other methods can be used for assigning a value to the base level of the Laplacian pyramid such as the by-pixel average of the base levels of the images.

Preferably, the maximum level N is a parameter such that the base level of the Laplacian pyramid is approximately 4 pixels by 4.

In yet another aspect of the present invention, an imaging method is provided for recovering object visibility in a scene of a scattering medium, the method comprising the steps of:
(i) illuminating a scene in a scattering medium using an illumination system;
(ii) acquiring a first frame of the scene with an image acquisition equipment;
(iii) acquiring a second frame of either:
an illuminated void region in the scene, with no objects in sight;
a black object in the scene; or
a computer simulation of the backscatter value at each pixel based on knowledge of the scene structure or an equivalent analytical calculation; and
(iv) subtracting a portion or all of the second frame from the first frame to receive an enhanced image with improved contrast and brightness range across the field of view.

Since the second frame contains no object, it shows the full backscatter of the scene. The second frame can thus be subtracted from any image of an object taken from the scene, in order to receive a clearer image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13A: assuming $p_{obj}$=0. FIG. 13B: Using an estimated $p_{obj}$.

FIG. 18 shows an improved image wherein FIGS. 16 and 17 are added together.

FIG. 19 shows an improved image wherein FIGS. 16 and 17 are fused together according to the invention.

FIG. 22 shows an improved image wherein FIGS. 20 and 21 are added together.

FIG. 23 shows an improved image wherein FIGS. 20 and 21 are fused together according to the invention.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

2. Theoretical Background
2.1 Artificial Illumination

Consider a camera in a scattering medium. At pixel (x; y), the measured image I(x; y) is the sum of the object signal S(x; y) and a backscatter component B(x; y), $$I(x,y)=S(x,y)+B(x,y). \quad (1)$$

We now detail these components. Let z be the axial distance from the camera of a point in the volume. This scene point is at a distance $R_{source}$ (x, y, z) from a light source which resides by the camera. The source radiance is $L^{source}$. The irradiance of the scene point [J. S. Jaffe. Computer modeling and the design of optimal underwater imaging systems. IEEE J. Oceanic Eng., 15:101-111, 1990] due to this source is $$I^{source}(x, y, z) = L^{source} \frac{\exp[-cR_{source}(x, y, z)]}{R_{source}^2(x, y, z)}. \quad (2)$$

Eq. (2) is affected by the medium, which is characterized by an attenuation coefficient c and by the $1/R_{source}^2$ falloff caused by free space propagation.

Here c=a+b, where a is the absorption coefficient of the medium and b is its total scattering coefficient. The latter expresses the ability of an infinitesimal medium volume to scatter flux in all directions. Integrating over all solid angles Θ, $$b = \int_\Theta b(\Theta) d\Omega = 2\pi \int_0^\pi b(\theta)\sin(\theta) d\theta; \quad (3)$$

where $\theta \in [0,\pi]$ is the scattering angle relative to the propagation direction [C. D. Mobley. Light and Water: Radiative Transfer in Natural Waters, chapter 3,5. San-Diego: Academic Press, 1994]. Note that the variables a; b(θ) and c are all functions of the wavelength. The range $\theta \in [0,\pi/2)$ corresponds to forward scattering, while $\theta \in [\pi/2,\pi]$ corresponds to backscattering.

Figure 2:
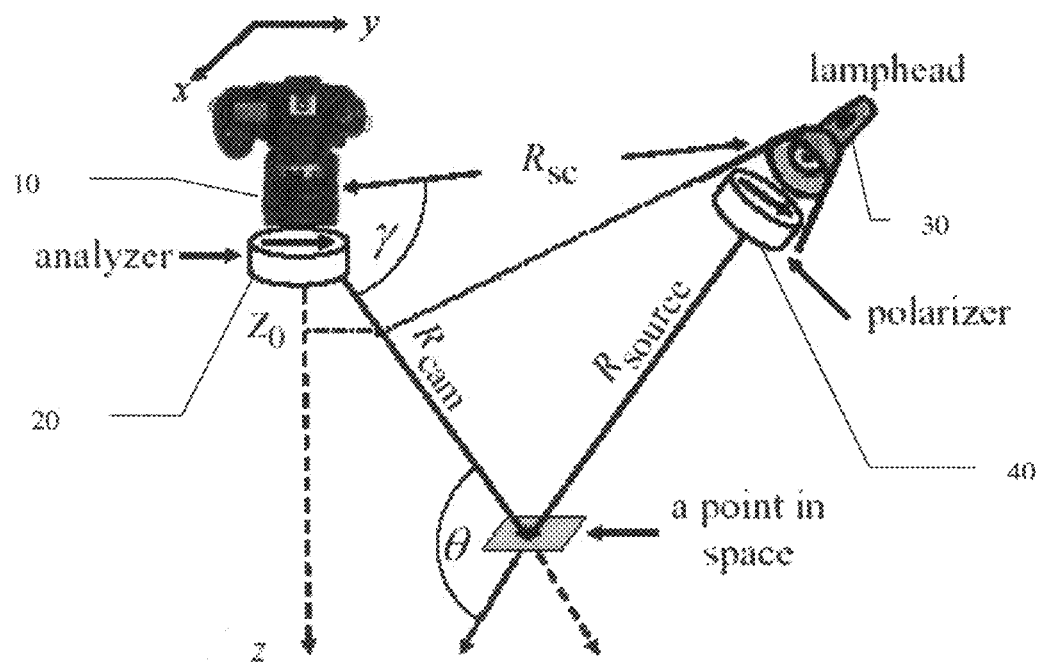
FIG. 2 shows a basic camera and illumination setup according to the invention.

Since the camera is beside the artificial illumination source, it is backscatter that affects the sensed image most. It is a result of accumulation [J. S. Jaffe. Computer modeling and the design of optimal underwater imaging systems. IEEE J. Oceanic Eng., 15:101-111, 1990; B. L. McGlamery. A computer model for underwater camera system. In Proc. SPIE, volume 208, pages 221-231, 1979] of all backscattered light along the line of sight (LOS). Any backscattering from a particle in the medium undergoes attenuation in the distance. FIG. 2 shows a basic camera 10 and illumination setup according to the invention. The camera 10 comprises an analyzer 20 and the illumination system comprises a lamphead 30 and a polarizer 40. $R_{cam}$—distance of a point from the camera 10; $R_{source}$—distance of a point from a light source; $R_{sc}$—baseline; θ—scattering angle; γ—angle between baseline and LOS; x, y—image coordinates; z—axial coordinate; $Z_0$—axial distance to first intersection of light with the LOS.

$$R_{cam} = \sqrt{(\alpha x)^2 + (\alpha y)^2 + z^2} \quad (4)$$

between that particle and the camera 10, where α(z) is the camera 10 magnification. Integrating all these scattering incidences, $$B(x, y) = \int_0^{Z_{obj}(x,y)} b[\theta(z)]I^{source}(z)\exp[-cR_{cam}(z)] dz. \quad (5)$$

The integration stops where an object is encountered in a distance $Z_{obj}$. Note that θ, $I^{source}$ and $R_{cam}$ all change with z. Moreover, they all depend on (x, y).

2.2 Object Signal

Define $L_{object}(x, y)$ as the object radiance we would have sensed had no falloff occurred (as if scene irradiance is done by a distant source, with no attenuating media). The object irradiance suffers [J. S. Jaffe. Computer modelling and the design of optimal underwater imaging systems. IEEE J. Oceanic Eng., 15:101-111, 1990; B. L. McGlamery. A computer model for underwater camera system. In Proc. SPIE, volume 208, pages 221-231, 1979] from falloff as described in Eq. (2). Blur due to forward scattering affects image quality less than the other effects [Y. Y. Schechner and N. Karpel. Clear underwater vision. In Proc. IEEE CVPR, volume 1, pages 536-543, 2004]. Light reflected from the object then undergoes attenuation along the LOS. We define a falloff function $$F(x, y) = \frac{e^{-c[R_{source}(x,y,Z_{obj})+R_{cam}(x,y,Z_{obj})]}}{R_{source}^2(x, y, Z_{obj})}. \quad (6)$$

Hence, the signal originating from the object is $$S(x,y) = L^{object}(x,y)F(x,y). \quad (7)$$

2.3 Active Polarization Imaging

By mounting a polarizer 40 on the light source, we polarize the illumination (see [E. Hecht. Optics, chapter 8,13. Addison Wesley, 4th edition, 2002] for polarization definitions). This light is then backscattered by particles in the medium. Had the backscattered light been completely polarized, it could have been optically eliminated by a camera 10 mounted polarizer 40 (an analyzer 20). However, backscattering involves some depolarization, i.e., some energy of the light becomes unpolarized, hence cannot be blocked by an analyzer 20. Nevertheless, a substantial degree of polarization (DOP) is maintained upon backscattering. The invention exploits this phenomenon. Once light is backscattered, it propagates through the scattering medium towards the camera 10. During this propagation, it further depolarizes [N. Shashar, S. Sabbah, and T. W. Cronin. Transmission of linearly polarized light in seawater: implications for polarization signaling. J. Exper. Biology, 207:3619-3628, 2004]. This process is complex and depends on the distribution of particle types and sizes and polarization type [. Jarry, E. Steimer, V. Damaschini, M. Epifanie, M. Ju-rczak, and R. Kaiser. Coherence and polarization of light propagating through scattering media and biological tissues. App. Opt., 37:7357-7367, 1998; G. W. Kattawar and M. J. Rakovic. Virtues of Mueller Matrix Imaging for Underwater Target Detection. App. Opt., 38:64316438, 1999; F. C. MacKintosh, J. X. Zhu, D. J. Pine, and D. A. Weitz. Polarization memory of multiply scattered light. Phys. Rev. B 40, 13:9342-9345, 1989; V. Sankaran, J. T. Walsh, and D. J. Maitland. Comparative study of polarized light propagation in biologic tissues. J. Biomed. Opt., 7:300-306, 2002]. A preliminary empirical study [. D. Gilbert and J. C. Pernicka. Improvement of underwater visibility by reduction of backscatter with a circular polarization technique. App. Opt., 6:741-746, 1967] showed that if the illumination is circularly polarized, then a significant improvement of contrast can be achieved optically in water. The bottom line, however, is that this phenomenon is not well modeled yet for most real world media.

3 Scene Rendering

To make scene reconstruction tractable, we sought approximations. We obtained this by rendering underwater scenes based on the models of Sec. 2. This enabled us to gauge the importance of various effects and setup parameters, such as camera 10 illuminator baseline, scene range, medium coefficients, illumination spectrum and angular non-uniformity of the light source.

Figure 3:
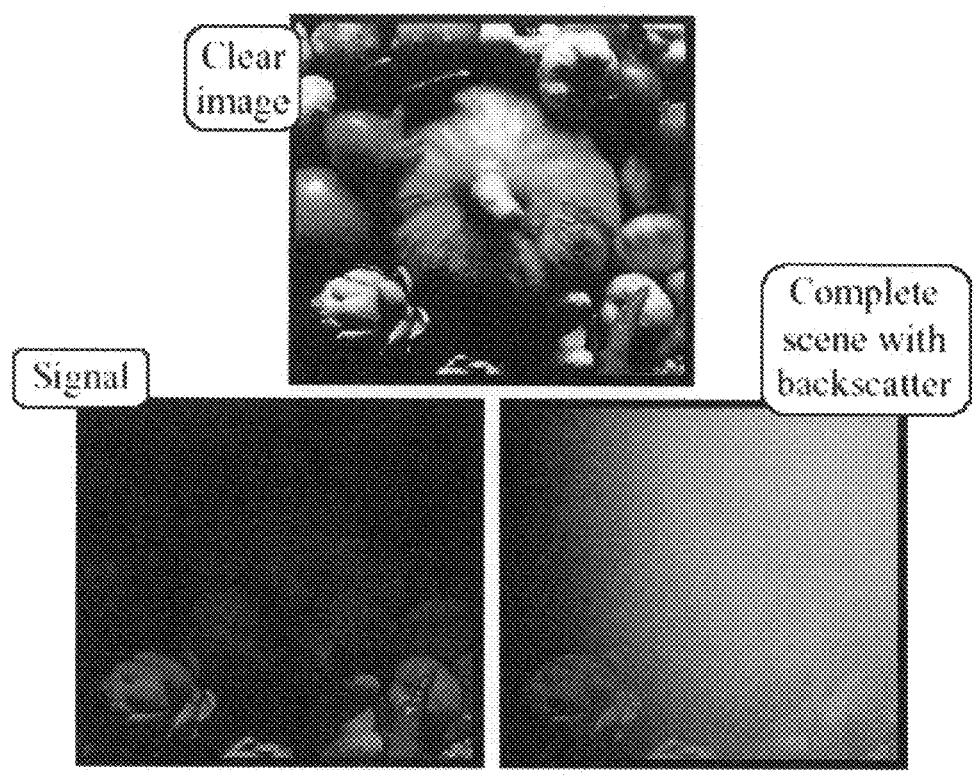
FIG. 3 shows an actively illuminated scene depicting three pictures: a clear image (top), a signal derived from the object in the picture (left), and the complete scene with backscatter (right).

For experimentation purposes, rendering relied on the properties of a Nikon D100, a 20 mm lens and the spectrum of a 100 W Quartz Tungsten Halogen bulb [Newport. Oriel Light Resources, 2004. p. I-28]. For example, the simulated source in FIG. 3 is placed 14 cm to the upper-right of the camera 10 lens, with its axis parallel to the camera 10 axis. The angular spread and non-uniformity of the source are similar to those of the one we used in experiments. The rest of the parameters were variable. The scene was assigned a distance map, e.g., varying linearly with y in the range 0.5-4.5 m.

FIG. 3 shows a clear image $L^{object}$. Here we used oceanic water characteristics (absorption and scattering specifications) as in [C. D. Mobley. Light and Water: Radiative Transfer in Natural Waters, chapter 3,5. San-Diego: Academic Press, 1994]. A signal derived from this object is shown as well, next to the corresponding image I. It is clear that backscatter overwhelms the farther regions of the object. Moreover, these rendered images illustrate the non-uniformity of the backscatter and scene illumination caused by the falloff.

4 Assumptions and Approximations

For efficient rendering as well as reconstruction, it is beneficial to make some assumptions and approximations.

Depolarization—As a default, we assume that depolarization due to propagation is not significant, since effective propagation distances are rather short in widefield artificial illumination [B. Skerry and H. Hall. Successful Underwater Photography. New York: Amphoto books, 2002], due to the falloff function (Eq. 6).

The object's signal. The method works best when S is unpolarized as explained in [Y. Y. Schechner and N. Karpel. Recovery of underwater visibility and structure by polarization analysis. IEEE J. Oceanic Eng., 30:570-587, 2005].

Uniform backscatter coefficient—In the following, we mainly refer to oceanic water. In this environment, according to [A. A. Kokhanovsky. Light Scattering Media Optics, page 200. Springer, 3rd edition, 2004], the function $b(\theta)$ is insensitive to $\theta$ at backscatter angles ($\theta \gtrsim \pi/2$). Hence, we denote its typical value as $\tilde{b}$. This simplifies the backscatter integrations.

A closed form parametric expression for the backscatter integral—Before we justify this in general, let us first consider a special case in which the camera 10 illuminator baseline is very small, relative to the object distance. In this case, $$R_{source}(x,y) \approx R_{cam}(x,y). \tag{8}$$

Hence, $$F_{approx}(x, y, z) = \frac{\exp[-2cR_{cam}(x, y, z)]}{R_{cam}^2(x, y, z)}, \tag{9}$$

and $$B(x, y) \approx \tilde{b} L^{source} \int_{Z_0(x,y)}^{Z(x,y)} F_{approx}(x, y, z) \, dz. \tag{10}$$

Note that the integration does not start at z=0. The reason is that light from the source does not illuminate the space interfacing with the camera 10 lens. Rather, there is a minimum distance $Z_0$, at which light rays from the illumination source intersect the LOS. If the light cone emitted by the illuminator was sharp, then $Z_0$ could have been geometrically calculated. The range $z<Z_0$ is effectively dark, and therefore does not contribute to the backscatter. Note that $Z_0$ is a function of the pixel coordinate (x, y).

An analytic solution to the integral in Eq. (10) is given as the series $$\frac{B}{\tilde{b}L^{source}} \approx \left[ -\frac{e^{-2cz}}{z} - 2c\ln z - 2c\sum_{n=1}^{\infty} \frac{(-2cz)^n}{n \cdot n!} \right]_{z=Z_0}^{z=Z}. \tag{11}$$

Now, consider a special case where $Z(x, y)=\infty$, i.e., effectively there is no object in front of the camera 10 at (x, y). Denote the backscatter value there as $B_\infty$ (x, y).

Figure 4:
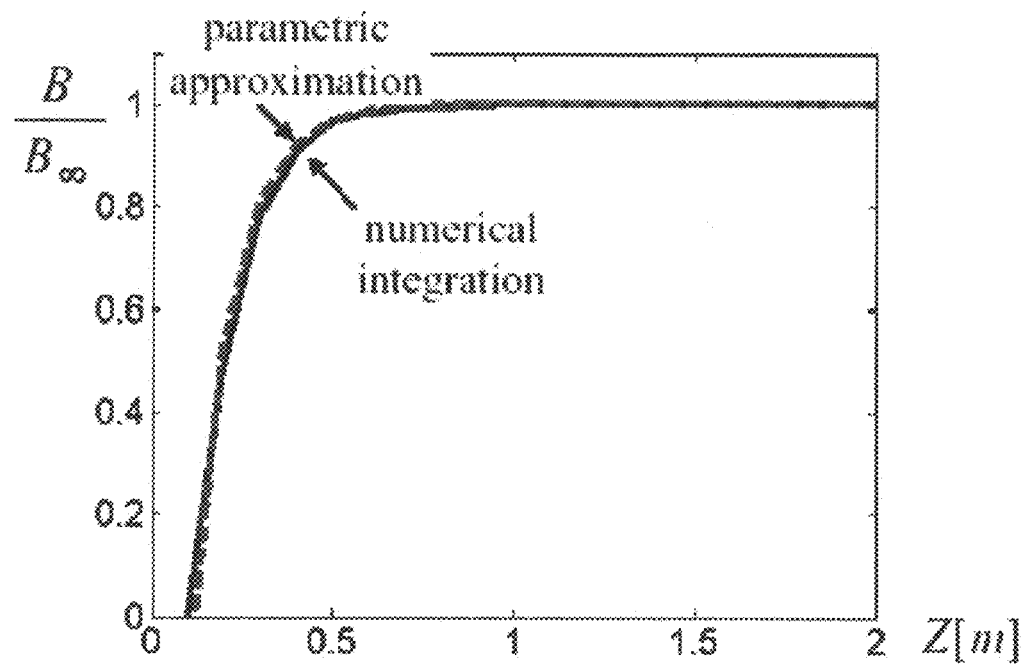
FIG. 4 is a graph showing the backscatter given by Eq. (10) as approximated by Eq. (12), with c=0:1 m$^{-1}$.

We found in extensive numerical simulations, that Eq. (11) can be well approximated as $$B \approx B_\infty \{1 - \exp[-k(Z-Z_0)]\} \tag{12}$$

where k is a parameter that depends only on c and $\tilde{b}$ for a given $Z_0$. An example is shown in FIG. 4, for a particular setup. Eq. (12) is simple. It has three parameters: an offset $Z_0$; a slope near $Z_0$, which is dictated by k, and a saturation value $B_\infty$. We use this approximation in our subsequent derivations.

In general, the setup is more complicated: a light source is not coaxial with the camera 10, it is very non-uniform and there are several sources, generally. Hence we simulated the backscatter resulting from such systems being in the medium. Even then, we discovered through simulations that the numerical integration of backscatter still follows the approximated model expressed in Eq. (12). The only difference is that the parameters $Z_0$, k and $B_\infty$ vary with (x, y). To conclude, we use Eq. (12) for backscatter caused by a general active illumination system in the medium. To work with the model, however, its parameters need to be determined per pixel. Next, we describe how they can be calibrated in-situ.

Note that [B. Sun, R. Ramamoorthi, S. Narasimhan, and S. Nayar. A practical analytic single scattering model for real time rendering. ACM TOG, 24:1040-1049, 2005] simplified the integral in Eq. (5) to a closed form containing values obtained from a pre-calculated lookup table. This expression is less useful when aiming to invert the process and is very sensitive to noise in the measurements.

Model Calibration

Suppose we have an uncalibrated active illumination system in a medium having unknown characteristics. How can we determine the parameters $Z_0$, k and $B_\infty$ for each pixel (x, y)? Note that $B_\infty$ (x, y) can be easily obtained: rigidly shift the camera 10/illuminator system, to take a photograph of a void region in the medium (where no object is in sight). The acquired image is simply $B_\infty$ (x, y).

We are left with two unknowns per pixel, $Z_0$ (x, y) and k(x, y). These can be derived by acquiring two calibration frames. A simple procedure is to photograph within the medium images of a black board. In one frame, the board is placed at a distance $Z_1$ from the camera 10, while in the second one it is placed at a distance $Z_2$. Since the object is black, the two frames measure only backscatter accumulated up to their respective depths $$I_i(x,y)=B_\infty(x,y)\{1-e^{-k(x,y)[Z_i-Z_0(x,y)]}\}, \tag{13}$$

for $i \in \{1, 2\}$. These are two nonlinear equations with two unknowns. By setting $Z_1$ and $Z_2$ close to the camera 10, a first order approximation $([1-\exp(-\eta)] \approx \eta)$ yields $$\hat{Z}_0 = \frac{I_1 Z_2 - I_2 Z_1}{I_1 - I_2}, \tag{14}$$

$$\hat{k} = \frac{I_1 - I_2}{B_\infty(Z_1 - Z_2)}.$$

Our simulations showed that $\hat{Z}_0$ is insensitive to the color channel. This is expected, since it has a geometric meaning:

the intersection of the LOS with the effective boundary of the illumination. We stress that this approximation (Eq. 12) is useful in scene recovery, as detailed in Sec. 5. To demonstrate the effectiveness of the parametric approximation, we performed this parameter calibration, and then used Eq. (12) to render backscatter in scenes. The result is almost indistinguishable from that obtained by numeric integration of backscatter derived from first principles.

5 Scene Reconstruction

We wish to overcome the visibility degradation, and also to estimate a 3D map of the scene. The method has two steps. The first is acquisition using active polarized-illumination and a camera 10 mounted polarizer 40. The second is image analysis. We now describe the principles as well as embodiments of the system.

5.1 Taking the Plunge

Figure 5:
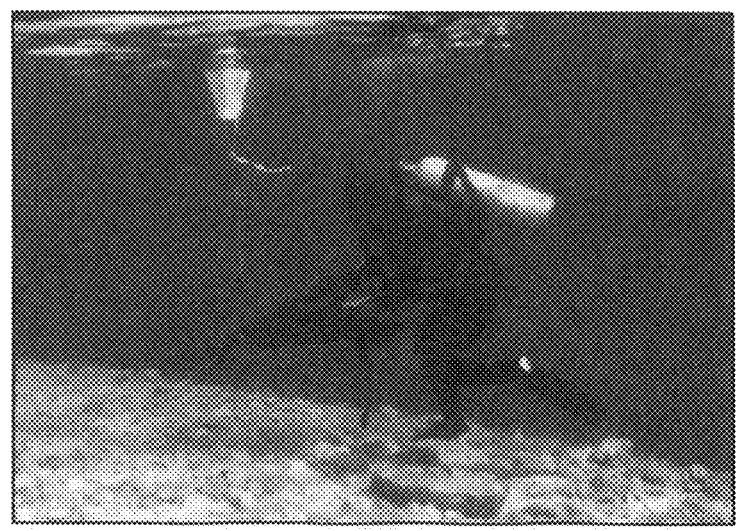
FIG. 5 is a picture showing scuba diving with a lift bag towards night experiments in the Red Sea.

The experiments were done while scuba diving at night in various environments, as described above. To observe color effects in the images, we prepared colorful patch-targets and took them with us. The camera 10 was mounted on a tripod with weights on. To safely sink and float this amount of equipment in a dive, we used a lift bag as shown in FIG. 5.

Other studies have experimented with indoor water tanks, diluting a fixed substance, usually milk. The particles in milk and other lipid substances are usually homogenic and symmetric [G. Jarry, E. Steimer, V. Damaschini, M. Epifanie, M. Ju-rczak, and R. Kaiser. Coherence and polarization of light propagating through scattering media and biological tissues. App. Opt., 37:7357-7367, 1998; V. Sankaran, J. T. Walsh, and D. J. Maitland. Comparative study of polarized light propagation in biologic tissues. J. Biomed. Opt., 7:300-306, 2002] while oceanic particles are heterogeneous [C. D. Mobley. Light and Water: Radiative Transfer in Natural Waters, chapter 3,5. San-Diego: Academic Press, 1994]. Therefore, we were concerned that polarization experiments done with milk would not represent correctly the properties of the media in the field, e.g., seawater. Thus, we embarked on outdoor dives.

5.2 Image Acquisition

Figure 6:
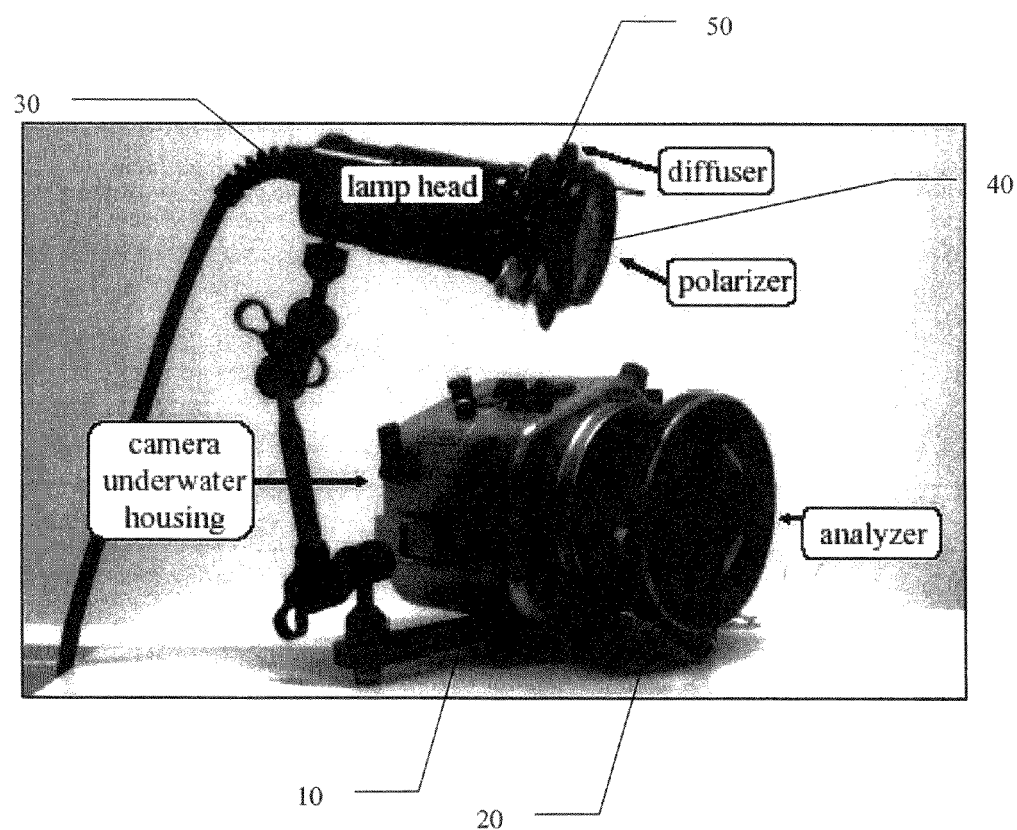
FIG. 6 is a single-lamphead version of the system of the invention.

An example of a system setup is depicted in FIGS. 2 and 6. Polarizers 40 are mounted on the sources while a polarizer 40 is mounted on the camera 10 (analyzer 20). The polarizers 40 are either both linear or both circular [G. D. Gilbert and J. C. Pernicka. Improvement of underwater visibility by reduction of backscatter with a circular polarization technique. App. Opt., 6:741-746, 1967] polarizers 40. Note that it is more difficult to switch states (handedness) of circular polarization than to switch linear orthogonal states. Anyway, images are taken with the analyzer 20 in two orthogonal polarization states. The first state is chosen to be the one with minimum visible backscatter, denoted $I^{min}$. The second state has maximum backscatter, denoted $I^{max}$. Another option is to take one image with an analyzer 20 mounted on the imaging device (either $I^{min}$ or $I^{max}$), and one without an analyzer 20 at all, denoted $I^{tot}$. The 2nd polarization state can then be calculated using Eq. (16). Practically, an image without a polarizer 40 or analyzer 20 can be viewed as a special case of a polarization setting/state.

We used a Nikon D100 camera 10, which has a linear response [Y. Y. Schechner and N. Karpel. Recovery of underwater visibility and structure by polarization analysis. IEEE J. Oceanic Eng., 30:570-587, 2005]. The camera 10 was placed in a Sealux underwater housing. We also used AquaVideo light sources, with 80 W Halogen bulbs. Reasons for this selection are detailed in the Appendix. As described in the following, we often measured a significant DOP of backscatter in experiments. Therefore, sometimes even the single $I_{min}$ image results in a dramatic improvement.

5.3 Backscatter Removal

Often, substantial backscatter is resistant to optical filtering. Further reduction of backscatter is achieved by post processing $I_{min}$ and $I_{max}$. As discussed in Sec. 2.3, the backscatter has a certain DOP, so its contribution varies among the two frames. Since in Sec. 4 the signal is assumed to be unpolarized, the images we take are $$I^{min}=S/2+B^{min}, I^{max}=S/2+B^{max}, \quad (15)$$

where $B^{min}$ and $B^{max}$ are the backscatter intensities in the respective polarization filtered images. Without a polarization analyzer 20, the image acquired would have been $$I^{tot}=I^{min}+I^{max} \quad (16)$$

The DOP of the backscatter is $$p(x, y) = \frac{B^{max} - B^{min}}{B}. \quad (17)$$

If we know p(x, y), then using Eqs. (15,17) the backscatter in every point can be calculated as $$B(x, y) = \frac{I^{max}(x, y) - I^{min}(x, y)}{p(x, y)}. \quad (18)$$

Here we make another assumption:

Uniform DOP of backscatter—In experiments we made in various underwater environments and in different periods, we noticed a surprisingly simple behavior: the DOP of the accumulated backscatter is practically constant across the FOV despite the angular spread of the illumination and views. Thus p(x, y)=p. We found it is constant up to ≈24° relative to the optical axis.

We extract the DOP directly from the images. Note that in areas where there is no object, $I^{tot}=B=B_\infty$. Therefore, we can choose an area in the image where no object exists, and then extract the DOP from the image using Eq. (17). Alternatively, it can be taken in the calibration step of $B_\infty$ (x, y). Based on p and Eq. (18), we estimate the backscatter and then remove it from the raw image $$S(x,y)=I^{tot}(x,y)-B(x,y). \quad (19)$$

The backscatter removal results in a more uniform brightness, decreasing dynamic range problems. This enables better contrast and brightness range across the FOV.

Figure 1:
FIG. 1 shows an underwater image taken in the Mediterranean Sea with two artificial light sources according to prior art techniques.
Figure 7A:
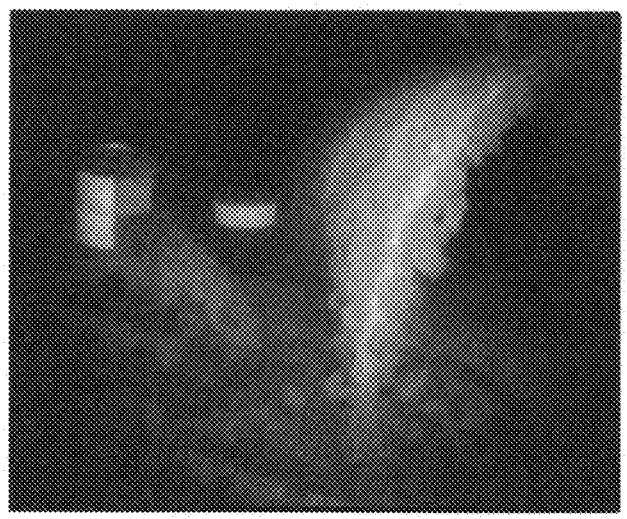
FIG. 7A shows a scene corresponding to FIG. 1 after applying the backscatter removal method of the invention.
Figure 7B:
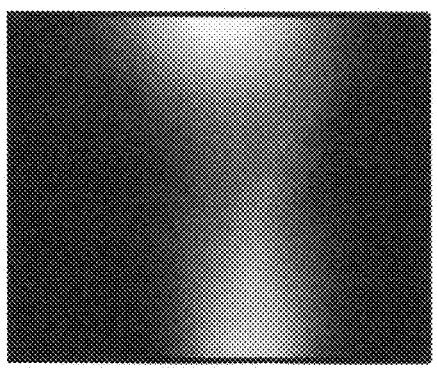
FIG. 7B shows the estimated backscatter of the same scene.

FIG. 1 shows an unpolarized image taken with our system in the Mediterranean, with sea conditions of approximately 8 m visibility. Here we used two light sources placed 10 cm above and below the LOS. The estimated DOP in this case was 80%. The backscatter greatly degrades visibility, and its non-uniformity creates dynamic range problems. FIG. 7A shows the result of applying Eqs. (18,19) on the scene shown in FIG. 1, while FIG. 7B shows the estimated backscatter. There is a significant improvement of visibility compared to the raw frame. Note the revealed rocks in the upper left and bottom, the sand in the periphery and the distant tube region.

Figure 8A:
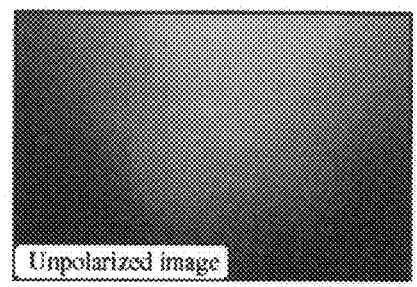
FIGS. 8A-B show images taken in the Sea of Galilee with the system of the invention using one light source at the top.
Figure 8B:
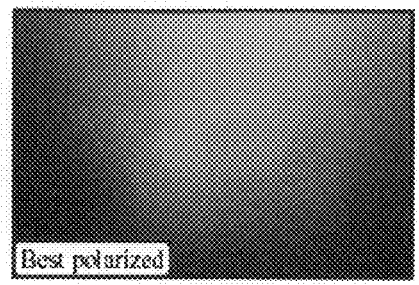
Figure 8C:
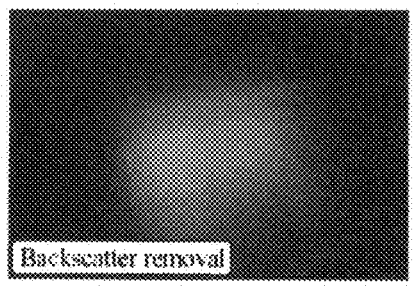
FIGS. 8C-D show the results of applying the method of the invention to the images taken.
Figure 8D:
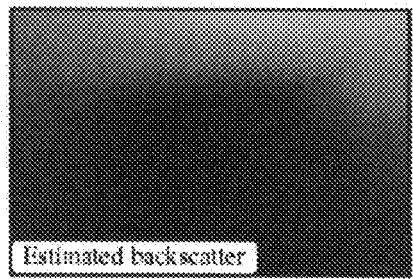

FIGS. 8A-D show an image taken in the fresh water Sea of Galilee with poor visibility of about 0.5 m (which imposed significant inconvenience during the experiment). In this setup we used one light source, which was placed 10 cm above the LOS. The resulting circular DOP was 9%. The imaged bucket is of the same size as the one shown in FIG. 7, just much closer. Despite its proximity, its rear edge is not visible in the raw images. In contrast, after applying Eqs. (18, 19) to the circular polarization pair, the rear edge is unveiled (though blurred). The darkness above that edge correctly indicates the void above and behind the bucket. FIG. 8A shows an unpolarized image, FIG. 8B shows a best polarized image, FIG. 8A shows an image with backscatter removed according to the invention, and FIG. 8A shows the estimated backscatter.

5.4 Falloff Estimation

As discussed in Sec. 2.1, the amount of backscatter in each pixel is related to the distance of the corresponding object. The farther it is, the more backscatter accumulates along the LOS. In the previous section, we extracted the backscatter map, which indicates the object distance, i.e., the 3D structure of the scene. Furthermore, having this estimation, we can somewhat compensate for the falloff. The depth values are derived from Eq. (12):

$$\hat{Z}_{obj}(x, y) = Z_0(x, y) - \left[\ln\left(1 - \frac{B(x, y)}{B_\infty(x, y)}\right)\right] / k(x, y). \quad (20)$$

The parameters $k(x, y)$ and $Z_0(x, y)$ are calibrated as explained in Sec. 4.

One should be aware of the limitation of this approach for 3D recovery. For example, FIG. 4 shows the result of a numeric calculation of $B(z)$ using Eq. (10). In the first half a meter the backscatter increases at a high rate. Therefore, estimating distances in this range can be meaningful. On the other hand, after a distance of about 1 m the backscatter saturates. Hence trying to distinguish distances there is fruitless. The effective range can be increased to 2-3m when the baseline or the attenuation coefficient change.

After estimating $\hat{Z}_{obj}(x,y)$ in Eq. (20), it can now be used for estimating the falloff. For this, we need the attenuation coefficient c, which can be evaluated by a transmissiometer. In addition, we need $R_{source}$, which is derived based on a-priori knowledge about the system baseline: as in [B. Sun, R. Ramamoorthi, S. Narasimhan, and S. Nayar. A practical analytic single scattering model for real time rendering. ACM TOG, 24:1040-1049, 2005], it is sufficient to know camera light-source baseline $R_{sc}$, and the angle between this source and the LOS, γ (See FIG. 2). Then, $$R_{source} = \sqrt{R_{sc}^2 + R_{cam}^2 - 2R_{cam}R_{sc}\cos\gamma}. \quad (21)$$

The value of $\hat{R}_{cam}$ is estimated by setting $z=Z_{obj}$ in Eq. (4). Then Eq. (21) derives $\hat{R}_{source}$. Using them in Eq. (6), we get the estimated falloff $\hat{F}(x, y)$. The latter can be compensated for (see Eq. 7):

$$\hat{L}_{object}(x,y) = S(x,y)/\hat{F}(x,y). \quad (22)$$

Figure 9:
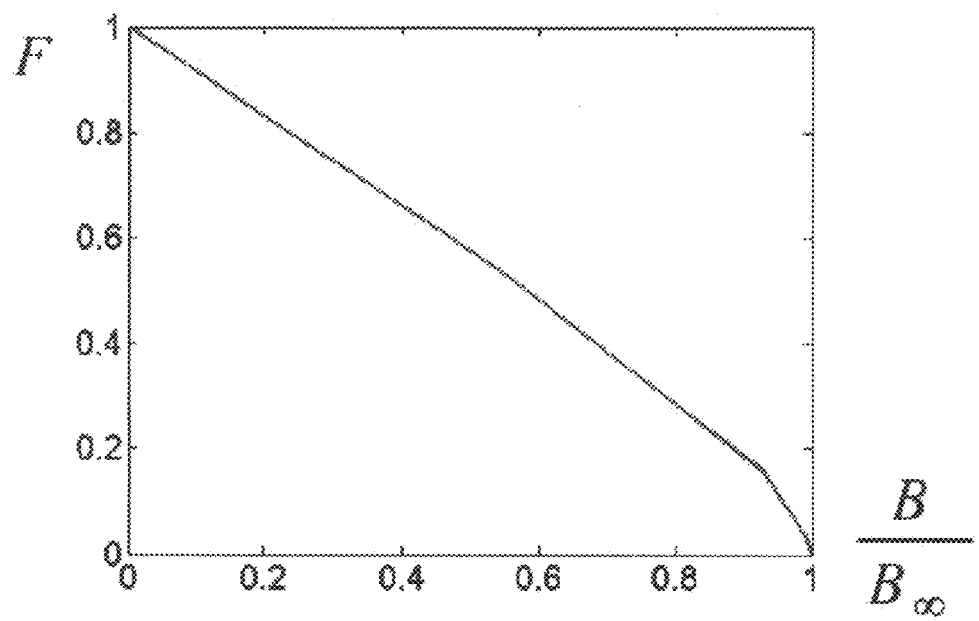
FIG. 9 is a graph showing normalized falloff as a typical function of the backscatter in an arbitrary pixel.

FIG. 9 shows a typical dependence of F on B (both are normalized by their maximal value). We can see that the function is stable and estimation of falloff based on backscatter is well-conditioned.

Figure 10A:
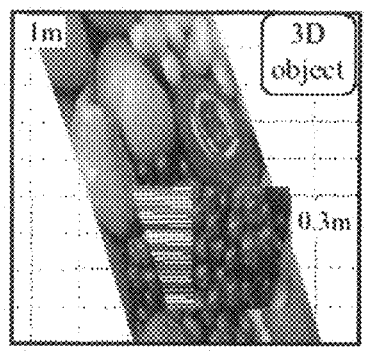
FIGS. 10A-D show simulated backscatter removal, 3D recovery and falloff compensation of a noisy object.
Figure 10B:
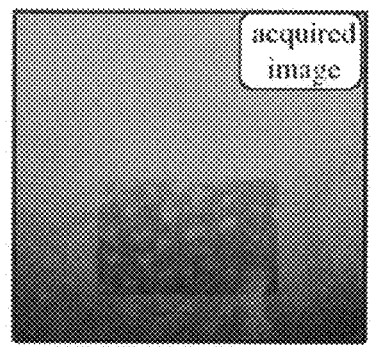
Figure 10C:
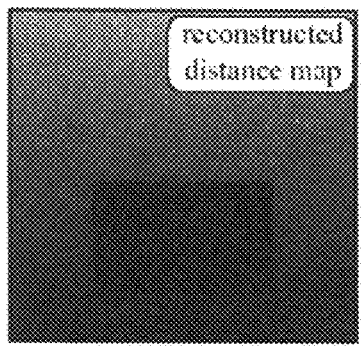
Figure 10D:
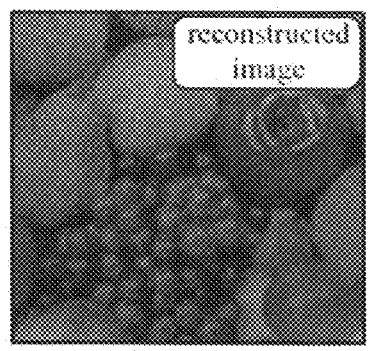

FIGS. 10A-D show a simulation of the entire recovery method. The image was assigned a non-trivial distance map and artificial noise was added with standard deviation of 1 grey level (out of 256 in the image). FIG. 10D shows the image after removal of the estimated backscatter and falloff compensation. While the image is enhanced relative to the acquired image (FIG. 10B), there is noise amplification in the distant parts. The reconstructed distance map (FIG. 10C) matches the original one (FIG. 10A).

6 Removing Backscatter Based on Known Distances

Out of preliminary knowledge of the scene structure (e.g. imaging in a pipeline) we can know the backscatter value at each pixel. For example, it can be calibrated by imaging a black object with the same structure. Another way is to model the 3D structure and calculate the value out of the model for the backscatter and calibration of medium properties. Alternatively, note that when moving in a scene with a constant structure, e.g. in a pipeline or in a constant height above ground, the backscatter value is temporally invariant, and may thus be estimated from an ordinary image sequence taken while moving in the structure.

Now, the backscatter value can be subtracted from every raw image to obtain a backscatter-free image. After this removal, the brightness of the image is more even and thus other image processing methods can be applied.

A specific example is a scene containing objects with distances larger than the effective backscatter saturation distance. This is easy to calibrate-simply point the system to an area with no object. Then, $B_\infty(x, y)$ can be simply subtracted from the raw image taken in the scene.

7 Enhancing Specular Objects

The polarization based algorithm is based on the assumption that the objects reflect depolarized light. However, in the case of a specular or polarizing objects, other methods such as polarization difference imaging [J. S. Tyo, M. P. Rowe, E. N. Pugh, and N. Engheta. Target detection in optically scattering media by polarization-difference imaging. App. Opt., 35:1855-1870, 1996] may work better. Many scenes contain both types of objects. We may thus have two resulting images at hand: one is a result of the method described in section 5. The other image is a result of methods tuned to polarizing objects. We can combine the two results (or more) by various methods of image fusion. An example is the image fusion method described in [A. Agrawal, R. Raskar, S. Nayar, and Y. Li. Removing photography artifacts using gradient projection and flash-exposure sampling. In Proc. ACM SIGGRAPH, 2005]. This would enhance both specular objects and diffuse objects.

8 Discussion

Our approach is instant, easy to build and cheap. It is a physics-based enhancement of contrast. The method is general enough and it can work even if not all the assumptions are true. The method of the invention can also yield a rough estimate of the 3D scene structure. Note that 3D reconstruction can be done mostly in short ranges, where the backscatter expression still varies rapidly and light still exists with sufficient intensity. On the other hand, visibility recovery is achieved throughout the range of the light source without limit. The practical limit of having less light reaching distant objects is fundamental to all active illumination methods.

The method of the invention can be combined with spatial/temporal scan methods. Scanners [G. R. Fournier, D. Bonnier, L. J. Forand, and P. W. Pace. Range-gated underwater laser imaging system. Opt. Eng, 32:2185-2190, 1993] can use lasers which generate polarized light by stimulated emission [E. Hecht. Optics, chapter 8,13. Addison Wesley, 4th edition, 2002] without loss, while projectors [M. Levoy, B. Chen, V. Vaish, M. Horowitz, I. McDowall, and M. Bolas. Synthetic aperture confocal imaging. ACM TOG, 23:825-834, 2004; S. G. Narasimhan, S. K. Nayar, B. Sun, and S. J. Koppal. Structured light in scattering media. In Proc. IEEE ICCV, volume 1, pages 420-427, 2005] often emit polarized light [M. Robinson, G. Sharp, and J. Chen. Polarization Engineering for LCD Projection. Wiley, 2005].

9 Visibility Enhancement in Scattering Media Using Fusion

In another aspect, the present invention relates to a method for visibility enhancement in scattering media with artificial and/or natural illumination, by using fusion techniques. In such media images suffer from two dominant problems: 1.

Backscatter—veils the object; and 2. Attenuation of light—causing limited visibility range and uneven scene illumination.

Those two effects cause the image to have high dynamic range problem. Some parts that are veiled by the backscatter may be almost invisible, and the parts that are not veiled may have relative low intensity. As a result, traditional image processing methods like contrast stretch may have a limited effect.

The fusion method of the invention aims to solve this problem. We suggest using two or more images of the same scene. The images should be different in their illumination. This can be achieved either by moving the light source, by using different light sources located in different places, by moving the camera 10 or any combination thereof. Specifically, we found that even a simple configuration of using one source at the top of the camera 10 and the second in the bottom yields excellent results. The acquired set of images is used to construct a good image of the scene.

The result is achieved by combining information from all the images using a quality criterion. In one embodiment of the present invention, the method of image fusion uses laplacian pyramid decomposition following [Peter J. Burt and Edward H. Adelson. The laplacian pyramid as a compact image code. IEEE Transactions On Communications, Com-31(4):532{540, April 1983]. In this decomposition, two pyramids are constructed for each image—the gaussian and the laplacian, denoted $G_i$ and $L_i$ accordingly. The level is indicated by the i index. The base level of the pyramid is defined as the level corresponding to the lowest spatial frequencies. As a result, the base level has the lowest resolution.

9.1 The Method Steps

1. Decompose each image into a gaussian and a laplacian pyramid, according to the description in [Peter J. Burt and Edward H. Adelson. The laplacian pyramid as a compact image code. IEEE Transactions On Communications, Com-31(4):532{540, April 1983]. The maximum level N is a parameter. We got best results setting N such that the base level size is approximately 4 pixels by 4.

2. Create a new laplacian pyramid, in which each level is composed of values from the corresponding level in the laplacian pyramids of all the images. The decision process is described in 9.2.

3. The base level is created using the base levels of the pyramids, using a different decision method, described in 9.3.

4. Decode the final image using the new pyramid.

9.2 Decision Making in Each Level

Various criterion functions exist in the literature. We found the one described in [A. Toet. Image fusion by a ratio of low pass pyramid. Pattern Recognition Letters, 9:245{253, 1989] to fit our problem best, although other methods can be used as well.

Suppose we have M frames. For each frame we compute another pyramid, a contrast pyramid. We start by computing a ratio of low pass pyramid, $R_i$ for each frame:

$$R_i = G_i / \text{expand}[G_{i+1}]. \quad (23)$$

The expand action is defined in [Peter J. Burt and Edward H. Adelson. The laplacian pyramid as a compact image code. IEEE Transactions On Communications, Com-31(4):532{540, April 1983]. This follows the definition of luminance contrast as:

$$\frac{\text{local contrast}}{\text{background contrast}} - 1. \quad (24)$$

Therefore, the contrast pyramid $C_i$ is defined by $$C_i = R_i - 1. \quad (25)$$

Then, the contrast pyramid helps to construct the new laplacian pyramid:

$$L_i(x, y) = L_{i,k}(x, y), k = \arg\max_j(C_{i,j}(x, y), j \in [1, M]). \quad (26)$$

Here we added a second index k∈[1,M] to the laplacian pyramid notation, which denotes the frame index. The decision can be different for each pixel, and therefore its location is denoted by (x, y).

9.3 Base Level

In various image fusion applications, the base level is usually combined by averaging the base levels or taking their maximum. We found out that those methods retain the non-uniform illumination so we suggest a different method. We assign the base level a constant value which is the average of all pixel values of all base levels. This action eliminates the low frequencies, leaving only a DC level. This idea is similar to homomorphic filtering [B. Johnston, M. S. Atkins, B. Mackiewich, and M. Anderson. Segmentation of multiple sclerosis lesions in intensity corrected multispectral mri. Ieee Transactions On Medical Imaging, 15(2):154{169, April 1996]. Low frequencies are usually associated to illumination in the scene. Therefore, replacing them with only a DC results in even illumination. However, this method works only if the pyramid level is chosen carefully, as suggested in 9.1. If the pyramid level is not deep enough, the resulting image is gray.

9.4 Why this Method Works

There are two key ideas:
1. Eliminating low frequencies makes the illumination even, and therefore enhances the details, even when applied to a single image.
2. When using different images of the same scene, each area has an image where it has the best contrast. Combining information using an appropriate criterion results in getting the best contrast for each area.

Backscatter Removal by Polarization-Extension to Polarized Objects

10 Model and Algorithm

Former studies have used polarized illumination for backscatter removal. In [T. Treibitz and Y. Y. Schechner. Instant 3descatter. In Proc. IEEE Computer Soc. Conf. on Computer Vision and Pattern Recognition, pages 1861 {1868, 2006] we assumed that the objects back-reflect unpolarized light to the camera 10. On the other hand, Polarization Difference Imaging (PDI) assumes that $p_{obj} \gg p_\infty$ [J. S. Tyo, M. P. Rowe, E. N. Pugh, and N. Engheta. Target detection in optically scattering media by polarization-difference imaging. App. Opt., 35:1855{1870, 1996]. Here we develop a generalized model, not requiring assumptions on the polarization of the objects. Fortunately, if the object yields polarized specular reflection, it behaves similarly to the backscatter: out of the two frames, generally, the one in which the backscatter is brighter is also the one in which the object back-reflection is brighter. In water, specular (rather than diffuse) reflection has the potential of strongly reflecting polarized light from a polarized source. Empirically, we never encountered a reversed polarization of the signal relative to the backscatter. Note that some studies [J. S. Taylor, Jr., and L. B. Wolff. Partial polarization signature results from the field testing of the shallow water real-time imaging polarimeter (SHRIMP). In Proc. MTS/IEEE OCEANS, volume 1, pages 107{116, 2001; J. S. Tyo, M. P. Rowe, E. N. Pugh, and N. Engheta. Target detection in optically scattering media by polarization-difference imaging. App. Opt., 35:1855{1870, 1996] assume the opposite—that the signal is polarized, ignoring the backscatter polarization.

As described in [T. Treibitz and Y. Y. Schechner. Instant 3descatter. In Proc. IEEE Computer Soc. Conf. on Computer Vision and Pattern Recognition, pages 1861{1868, 2006], we take two images of the same scene using two orthogonal polarization states of the polarizer 40. Had the backscattered light completely retained its polarization, it could have been optically eliminated by the analyzer 20. We discovered that a substantial DOP is maintained upon backscattering. We exploit this phenomenon (Polarization has also aided other computer vision aspects [M. Ben-Ezra. Segmentation with invisible keying signal. In Proc. IEEE CVPR, volume 1, pages 32{37, 2000; O. G. Cula, K. J. Dana, D. K. Pai, and D. Wang. Polarization multiplexing for bidirectional imaging. In Proc. IEEE CVPR, volume 2, pages 1116{1123, 2005; H. Farid and E. H. Adelson. Separating reflections and lighting using independent components analysis. In Proc. IEEE CVPR, volume 1, pages 262{267, 1999; D. Miyazaki and K. Ikeuchi. Inverse polarization raytracing: estimating surface shape of transparent objects. In Proc. IEEE CVPR, volume 2, pages 910{917, 2005; Y. Y. Schechner, S. G. Narasimhan, and S. K. Nayar. Instant dehazing of images using polarization Proc. IEEE CVPR, 1:325{332, 2001; L. B. Wolff. Polarization vision: a new sensory approach to image understanding. Image & Vision Comp., 15:81{93, 1997]). Consequently, placing an analyzer 20 in the orthogonal state to the backscatter's polarization state yields an image with minimum visible backscatter. We denote this image as $I_{min}$. Imaging with the opposite orthogonal state, denoted $I^{max}$, has the maximum backscatter. As described in the following, we often measured a significant DOP of backscatter in experiments.

A general image in a scattering medium can be expressed as:

$$I(x_{obj}) = S(x_{obj}) + B(x_{obj}). \tag{27}$$

where B is the backscatter component, S is the attenuated signal and $x_{obj}$ is the pixel coordinate. As a result, the image pair consists of:

$$I_{max}(x_{obj}) = S_{max}(x_{obj}) + B_{max}(x_{obj}). \; I_{min}(x_{obj}) = S_{min}(x_{obj}) + B_{min}(x_{obj}) \tag{28}$$

We define the degrees of polarization (DOPs) $p_{obj}$ and $p_\infty$ of the signal and the backscatter accordingly:

$$p_{obj}(x_{obj}) = \frac{S_{max}(x_{obj}) - S_{min}(x_{obj})}{S_{max}(x_{obj}) + S_{min}(x_{obj})}, \tag{29}$$

$$p_\infty(x_{obj}) = \frac{B_{max}(x_{obj}) - B_{min}(x_{obj})}{B_{max}(x_{obj}) + B_{min}(x_{obj})}$$

In the following we omit the $(x_{obj})$ for clarity. We end up with two equations for the two scene unknowns –S and B:

$$I_{max} + I_{min} = B + S \tag{30}$$

$$I_{max} - I_{min} = p_\infty B + p_{obj} S. \tag{31}$$

The last equation is derived from plugging Eq. (29) in Eq. (28). The solution to this equation set is:

$$\hat{S} = \frac{1}{p_\infty - p_{obj}}[I_{min}(1 + p_\infty) - I_{max}(1 - p_\infty)] \tag{32}$$

$$\hat{B} = \frac{1}{p_\infty - p_{obj}}[I_{max}(1 - p_{obj}) - I_{min}(1 + p_{obj})]. \tag{33}$$

This is a general result, enabling separation of B and S from the two raw images, given the DOPs $p_{obj}$ and $p_\infty$.

A very important property of Eq. 32 is that $p_{obj}$ contributes only a scale factor in the signal reconstruction. Therefore, if $p_{obj}$ is approximately constant across the scene, the signal estimation is true up to a scale even when ignoring $p_{obj}$. For purposes of visibility enhancement this is more than enough. The backscatter is removed, and missing parts are revealed. Furthermore, the resulting image has a smaller dynamic range. Thus, applying standard image enhancement techniques usually results in a further image improvement in contrary to applying those techniques on the raw images. As a consequence, many previous works [Y. Y. Schechner and N. Karpel. Recovery of underwater visibility and structure by polarization analysis. IEEE J. of Oceanic Eng., 30:570{587, 2005; Y. Y. Schechner, S. G. Narasimhan, and S. K. Nayar. Polarization-based vision through haze. App. Opt., 42:511 {525, 2003; T. Treibitz and Y. Y. Schechner. Instant 3descatter. In Proc. IEEE Computer Soc. Conf. on Computer Vision and Pattern Recognition, pages 1861 {11868, 2006; J. G. Walker, P. C. Y. Chang, and K. I. Hopcraft. Visibility depth improvement in active polarization imaging in scattering media. App. Opt., 39:4933{4941, 2000] achieved very good results based on this assumption. In this case Eq. (32) reduces to:

$$\hat{S} = [I_{min}(1+p_\infty) - I_{max}(1-p_\infty)]/p_\infty \tag{34}$$

$$\hat{B}(x,y) = (I_{max} - I_{min})/p_\infty. \tag{35}$$

Using Eq. (35) when $p_{obj} \neq 0$ yields a false estimation, $\tilde{B}$:

$$\tilde{B} = \frac{I_{max} - I_{min}}{p_\infty} = \hat{B} + \frac{S_{max} - S_{min}}{p_\infty} = \hat{B} + \frac{p_{obj}}{p_\infty}S. \tag{36}$$

The last equality results from plugging in the DOP $p_{obj}$ from Eq. (29). As explained in [T. Treibitz and Y. Y. Schechner. Instant 3descatter. In Proc. IEEE Computer Soc. Conf. on Computer Vision and Pattern Recognition, pages 1861{1868, 2006], B increases with distance whereas S decreases with the distance. A result of Eq. (10) is that $\hat{B}$ is no longer monotonic with $Z_{obj}$.

Some methods assume the opposite: $p_\infty/p_{obj} \approx 0$. Those are called Polarization Difference Imaging (PDI) [J. S. Tyo, M. P. Rowe, E. N. Pugh, and N. Engheta. Target detection in optically scattering media by polarization-difference imaging. App. Opt., 35:1855{1870, 1996]. Plugging this assumption to the above equations results in:

$$\hat{S} = \frac{1}{p_{obj}}[I_{max} - I_{min}], \tag{37}$$

$$\hat{B} = \frac{1}{p_{obj}}[I_{min}(1 + p_{obj}) - I_{max}(1 - p_{obj})]. \tag{38}$$

Note that in this case, Eq. (37) is a scaled version of the polarization difference image used in PDI.

Sec. 11 describes estimating the DOPs in the general case. First we show some results and introduce a 3D reconstruction approach.

11 Estimating $p_{obj}$

Figure 13A:
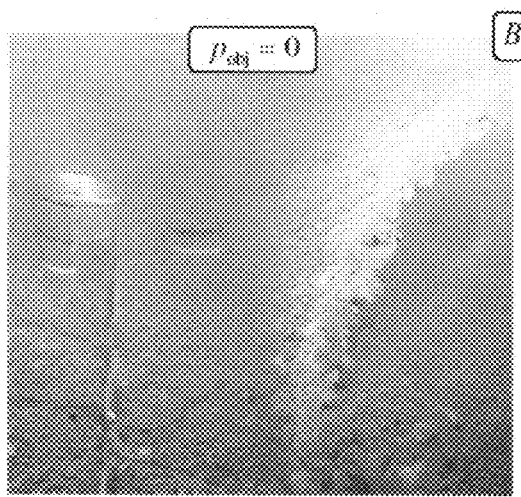
FIGS. 13A-B are an image of $\hat{B}/B_\infty$ for an underwater scene.
Figure 13B:
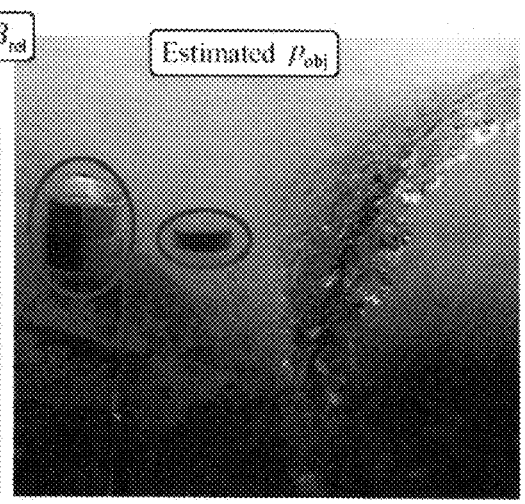

The need for an estimation for $p_{obj}$ arises when trying to estimate distances based on the wrong estimation of the backscatter, as described in [T. Treibitz and Y. Y. Schechner. Instant 3descatter. In Proc. IEEE Computer Soc. Conf. on Computer Vision and Pattern Recognition, pages 1861{1868, 2006]. We want to emphasize that compared to scenes taken under natural illumination [Y. Y. Schechner and N. Karpel. Recovery of underwater visibility and structure by polarization analysis. IEEE J. of Oceanic Eng., 30:570{587, 2005; Y. Y. Schechner, S. G. Narasimhan, and S. K. Nayar. Polarization-based vision through haze. App. Opt., 42:511{525, 2003], here the correct approximation of $p_{obj}$ is more important for using the backscatter for distance estimation. Under natural illumination the objects are usually further away, the light that hits them is usually only partially polarized and even if they back reflect polarized light, it has a low polarization degree and it depolarizes on the way to the camera 10. Under polarized artificial illumination conditions are usually different. The light that hits the objects usually has a higher degree of polarization and the imaged objects are much closer to the camera 10. Thus, there are cases when the light intensity that reaches the camera 10 from the objects has a considerable amount of polarization. Moreover, $p_{obj}$ decreases with object distance. For example, in the scenes we present in the following, the rocks, which are usually considered unpolarizing, were ≈30% polarized. Failing to estimate $p_{obj}$ correctly damages the monotonic relation between the estimated backscatter and the object distance. FIGS. 13A-B demonstrate that.

FIGS. 13A-B present an image of $\hat{B}/B_\infty$ for an underwater scene. FIG. 13A assumes $p_{obj}=0$. FIG. 13B: Using an estimated $p_{obj}$. In FIG. 13A areas in proximity to the camera 10 (lower part of the image) are falsely assigned a high value unlike the correct low values in FIG. 13B. Assuming $p_{obj}$ is constant across the scene, areas that do not comply to this assumption damage the monotonicity of $\hat{B}/B_\infty(Z_{obj})$ (blue ellipses).

FIG. 13A shows the calculated relation $B_{rel}$ with the assumption that $p_{obj}=0$. We can see that the entire image has approximately the same value no matter what the object distance is. On the other hand, the image taking into consideration $p_{obj}$ has a clear dependency on object distance—the closer front part and the left rock are darker. Thus it is better not to ignore $p_{obj}$. There are some cases when $p_{obj}$ can be sampled directly from the scene. When the light source lights from one side of the FOV to another, the objects in the far end are lit but no backscatter reaches the camera 10 (like in [S. G. Narasimhan, S. K. Nayar, B. Sun, and S. J. Koppal. Structured light in scattering media. In Proc. IEEE ICCV, volume 1, pages 420{427, 2005]). For example, the like red circled area in FIG. 14A. When sampling areas like this one I=S and $$p_{obj} = \frac{I_{max}(\text{clear area}) - I_{min}(\text{clear area})}{I_{max}(\text{clear area}) + I_{min}(\text{clear area})}. \quad (39)$$

The measured values were $p_{obj}$ [R, G, B]=[0.22, 0.27, 0.34].

Nevertheless, we present here a general automatic approach for that. It is based on the observation that using a wrong value for $p_{obj}$ results in a high cross-correlation between the backscatter and the signal components. Artifacts from the object signal can actually be seen in the backscatter estimation. Therefore, seeking for the value that minimizes the mutual information between both components results in the value of $p_{obj}$ we are looking for.

Figure 14A:
FIG. 14A is a scene with a polarized reflection from an object.
Figure 14B:
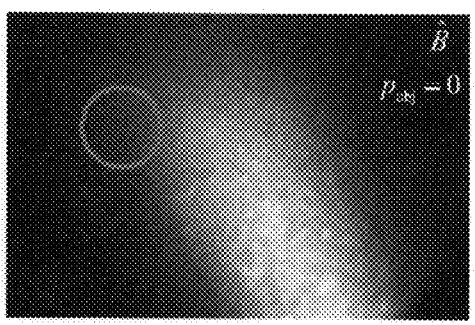
FIG. 14B is an image wherein the value of $\hat{B}$ is extracted assuming $p_{obj}$=0.
Figure 14C:
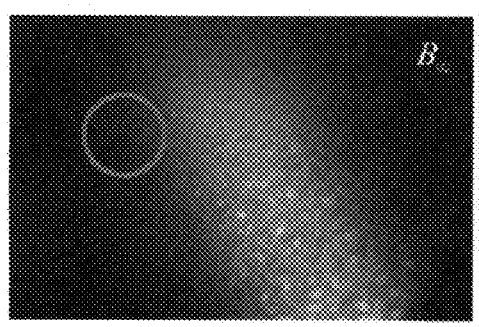
FIG. 14C shows $B_\infty$, wherein MI is calculated between $\hat{B}$ and $\hat{S}$ using different values of $p_{obj}$=0.
Figure 14D:
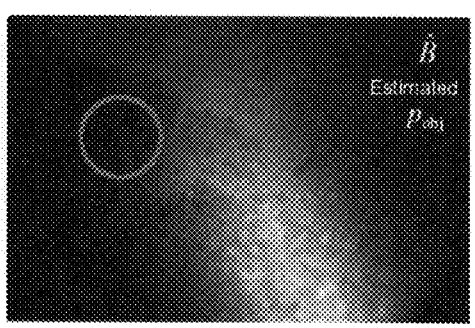
FIG. 14D is an image with correct value of $\hat{B}$.
Figure 14E:
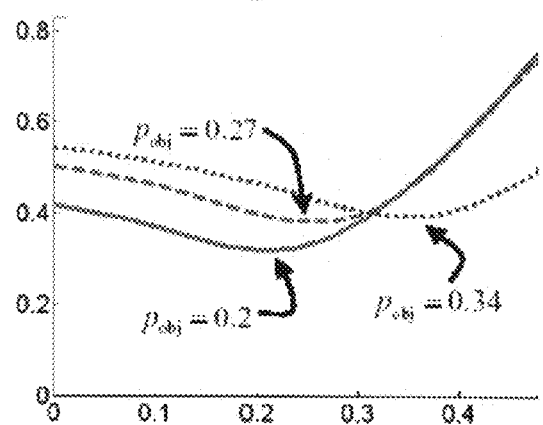
FIG. 14E is a graph of MI between $\hat{B}$ and $\hat{S}$ in each channel (R, G, B).

In FIGS. 14A-D we can see an example of an underwater scene. FIG. 14A is a scene with a polarized reflection from an object. FIG. 14B is an image wherein the value of $\hat{B}$ is extracted assuming $p_{obj}=0$. FIG. 14C shows $B_\infty$, FIG. 14D is an image of $\hat{B}$, using an estimated value of $p_{obj}$, using minimization of the mutual information. FIG. 14E is a graph of the mutual information between $\hat{B}$ and $\hat{S}$ in each channel (R, G, B), using different values for $p_{obj}$.

FIG. 14A shows the raw scene. Notice that the illumination comes from the bottom right corner of the FOV, and thus the rock in the top left part of the image (circled) is clearly lit but has no backscatter. Calculating the backscatter with the assumption that $p_{obj}=0$ results in a backscatter image with a high value in FIG. 14B. The rock is clearly seen there. Compared to the $B_\infty$ image FIG. 14C we see an unreasonable amplification of the backscatter in this part, as if it was very far. FIG. 14D shows the correct estimation of the backscatter—it is almost zero in this part. In the right side of FIG. 14 we can see the mutual information calculated between the signal and the backscatter components for different values of $p_{obj}$. We get minima, a slightly different one for each color channel. The values are almost identical to the sampled values as given above. Note, that once the DOP of a few known materials like rocks, sand, metals, etc., is known, it can be applied to different parts in the image without the need to recalculate it.

Figure 15:
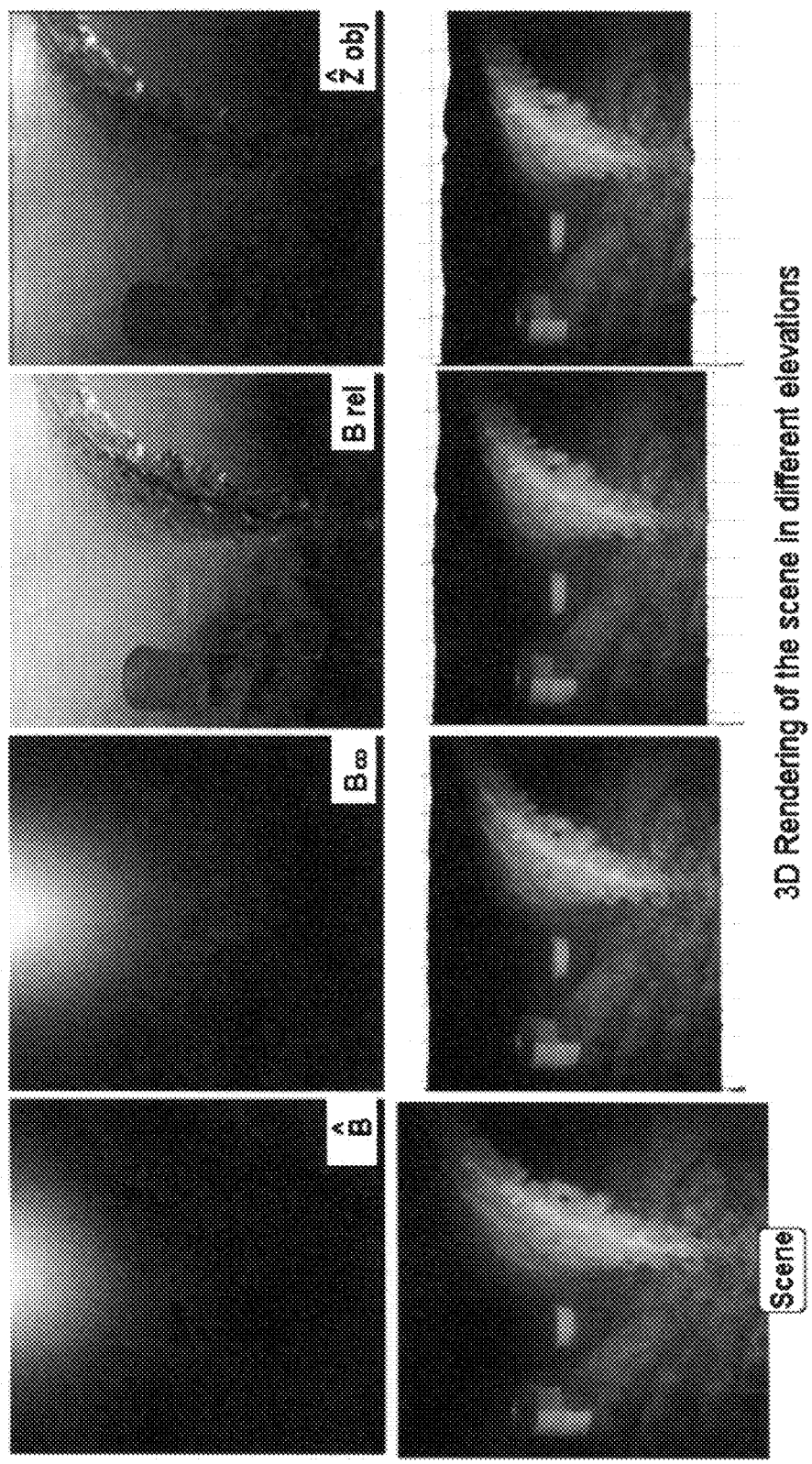
FIG. 15 is an estimation of a distance map in different elevations.
Figure 16:
FIG. 16 shows an image of a scene taken with an upper light source.
Figure 17:
FIG. 17 shows an image of the scene of FIG. 16 taken with a lower light source.
Figure 18:
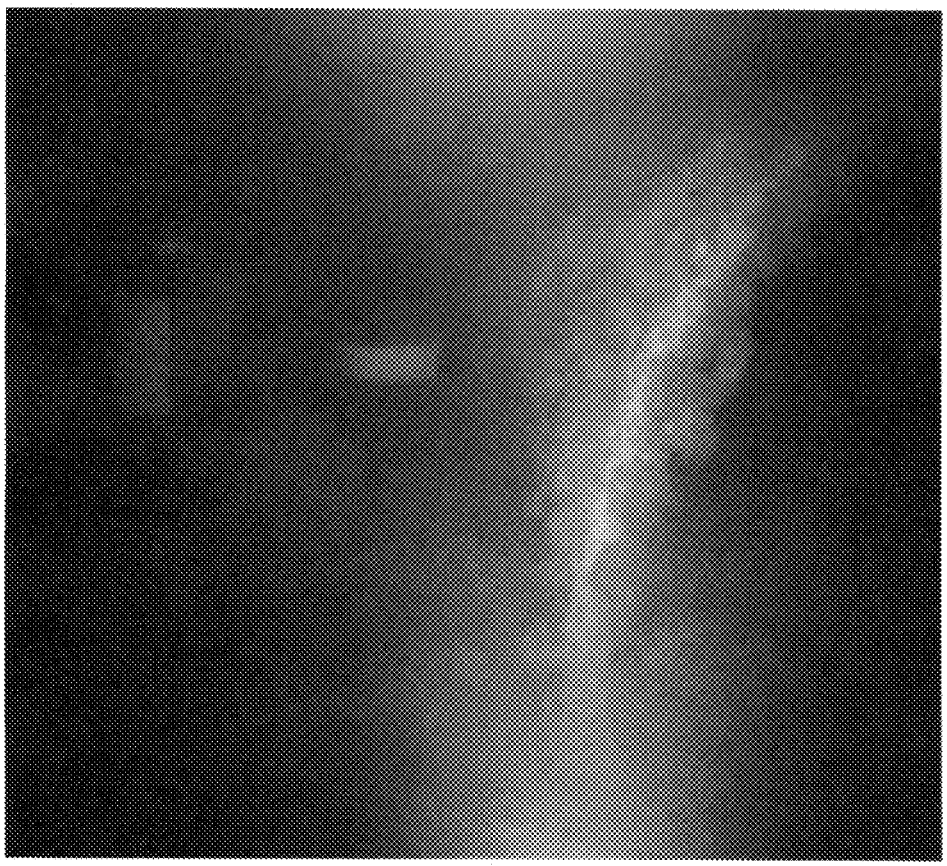
Figure 19:
Figure 20:
FIG. 20 shows an image of a scene taken with an upper light source.
Figure 21:
FIG. 21 shows an image of the scene of FIG. 20 taken with a lower light source.
Figure 22:
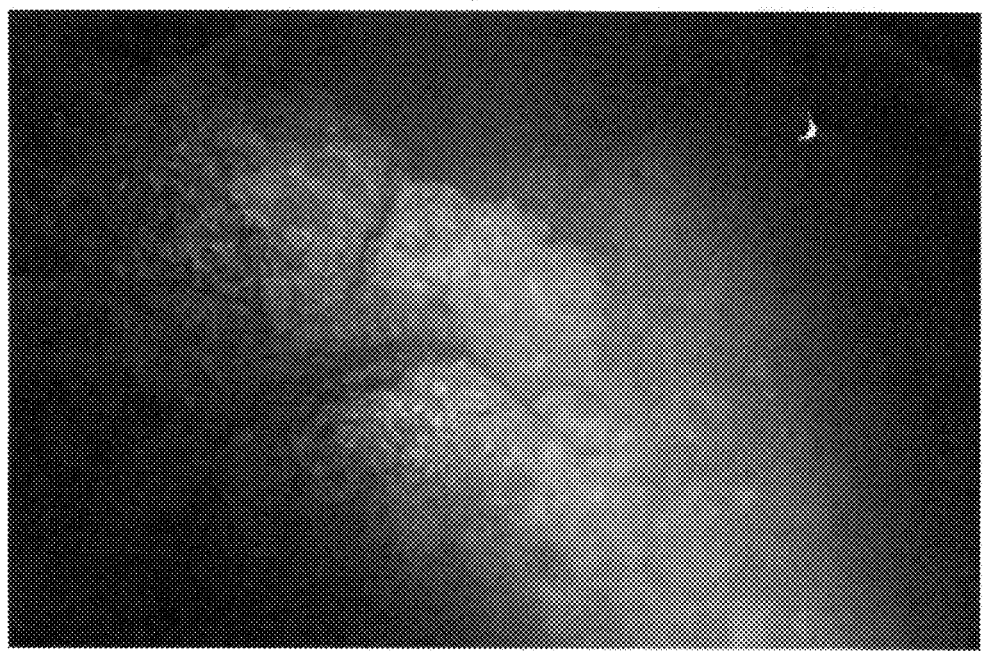
Figure 23:

The problem becomes more complicated when the DOP of the objects varies across the scene. In FIG. 13B we can see (in blue ellipses) two objects with a significantly different DOP than the rest of the scene. It causes distortions in backscatter image. In this case, we assigned those objects their exact DOP (0) in order to get an estimation of the distance map shown in FIG. 15. Let us calculate what will be the error in B using a wrong value for $\tilde{p}_{obj}=p_{obj}+d$, where d is the error.

$$\tilde{B} = \frac{1}{p_\infty - p_{obj} - d}[I_{max}(1 - p_{obj} - d) - I_{min}(1 + p_{obj} + d)] = \quad (40)$$

$$\frac{1}{p_\infty - p_{obj} - d}[I_{max}(1 - p_{obj}) - I_{min}(1 + p_{obj}) - d(I_{max} - I_{min})] = \quad (41)$$

$$\frac{p_\infty - p_{obj}}{p_\infty - p_{obj} - d}\hat{B} - \frac{d}{p_\infty - p_{obj} - d}[(I_{max} - I_{min})]. \quad (42)$$

We can see that overestimating $p_{obj}$ (d>0) results in a lower backscatter component. This can be seen in the area marked with the blue circles in FIG. 13B. In those parts $p_{obj}\approx 0$ and thus they appear darker than their environment. Moreover, because $p_{obj}$ varies in the color channels, they appear colored. On the other hand, underestimating $p_{obj}$ (d<0) results in a higher backscatter-like seen in FIG. 14B.

12 Calibration of Backscatter Approximation Parameters

As discussed earlier to calibrate the backscatter approximation parameters, we need values of the backscatter in two close distances to the camera 10. There are a few ways to achieve that:

1. Imaging a total absorbing black board in two distances.
2. Imaging two different boards in two distinct distances. The ratio between the albedos of the boards needs to be known a-priori. This is useful when an absorbing board is unavailable.

3. The polarization method can also be used to extract the backscatter. Care need to be taken not to use a material that reflects polarized light. This is sometimes hard to achieve.

12.1 Extracting Backscatter from Image of Two Boards

In every image in a scattering medium the acquired image I is composed of two components:

$$I = D + BS \tag{43}$$

where D is the direct transmission component and BS is the backscatter component. The direct component is the signal which is reflected from the illuminated object, attenuated according to the medium properties and its location relative to the camera 10 and to the light source.

$$D = I_0 a_i \frac{\exp[-\beta(R_c + R_s)]}{R_s^2} \tag{44}$$

where: $I_0$ is the light source intensity, $a_i$ the albedo, $\beta$ the medium attenuation coefficient, $R_c$ the object distance from camera 10 and $R_s$ the object distance from the light source. In general, they can vary for each pixel. Let us look at the specific case of imaging two boards with different albedos, located at the same distance from the camera 10. Except of the albedo, the rest of the parameters in the direct transmission component are constant. Therefore, using Eq. (43), we can express the ratio of both direct components $(D_1, D_2)$ as:

$$\alpha \doteq \frac{D_1}{D_2} = \frac{a_1}{a_2} = \frac{I_1 - BS}{I_2 - BS}, \tag{45}$$

where $I_1$, $I_2$ are the two raw images. From Eq. (45) we can extract the backscatter component:

$$BS = \frac{I_1 - \alpha I_2}{1 - \alpha}. \tag{46}$$

Assuming $\alpha$ is known, we get the backscatter. This process is done for each distance so we end up having two backscatter images that are used for calibration.

12.2 Attenuation Coefficient Extraction

After separating both image components, we can use the direct transmission component to estimate the medium attenuation coefficient.

$$\frac{D_1}{D_2} = \frac{R_{s_2}^2}{R_{s_1}^2} \exp[-\beta(R_{c_1} - R_{c_2} + R_{s_1} - R_{s_2})]. \tag{47}$$

All the parameters except of $\beta$ are known and therefore we can extract it. Note that $\beta$ is constant over the image and therefore we need to know only a small number of distances in order to extract it.

Appendix: Illumination Choices

An embodiment of the system is shown in FIG. 6. It consists of a light source; a diffuser 50 to make the light beam more uniform and widen its spread; a polarizer 40 for the light source; an SLR camera 10 with an underwater housing; and a polarizer 40 mounted on the camera 10. The considerations for choosing a camera 10 and a housing in conjunction to polarization filtering are detailed in [Y. Y. Schechner and N. Karpel. Recovery of underwater visibility and structure by polarization analysis. IEEE J. Oceanic Eng., 30:570-587, 2005]. As for the illumination, we had several requirements, beyond being watertight in the underwater depth, as detailed below.

Stability: We had to avoid uncontrolled illumination fluctuations in this research phase. This has overruled current arc-based flash bulbs, which have $\mathcal{O}(5\%)$ fluctuations [Hamamatsu. Xenon ash lamps. Catalog TLSX1008E04 (Hamamatsu Photnics K.K., Electron Tube Center), 1998]. DC incandescent sources are least prone to short-term fluctuations, once their temperature saturates.

Narrow lamphead exit aperture enables fitting high quality filters. This has overruled current large LED clusters or fluorescent bulbs.

Holographic diffusers 50 are used for higher transmission efficiency and smaller diffusing angles.

Sealed diffuser. High efficiency diffusers 50 are either ground/sandblusted glass or holographic. The former become clear (nondiffusing) in water, as their refractive index is nearly matched by water in their concavities. The latter are destroyed in water. Thus, we sealed the diffusers 50 in air spaced windows.

Diffuser 50 before polarizer. Diffusers 50 scramble light, causing depolarization. Lab tests verified a higher illumination DOP when the diffuser 50 is placed between the polarizer 40 and the lamphead 30, rather than facing the object.

High intensity extends the vision range in the water.

Enough battery power to last for long underwater experiments with fast recharging in field use.

Figure 11:
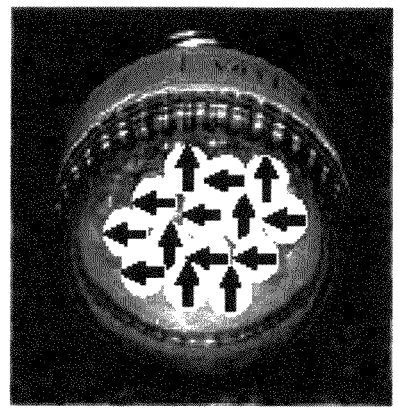
FIG. 11 is a polarized array of LEDs, where half of the LEDs are polarized perpendicular to the other LEDs.

Creating a double-polarized light source. One can use a polarized array of LEDs, where half of the LEDs are polarized perpendicular to the other LEDs (see FIG. 11). Then, a simple switch turns on only part of the LEDs such that different frames may have different polarization of the illumination.

Figure 12:
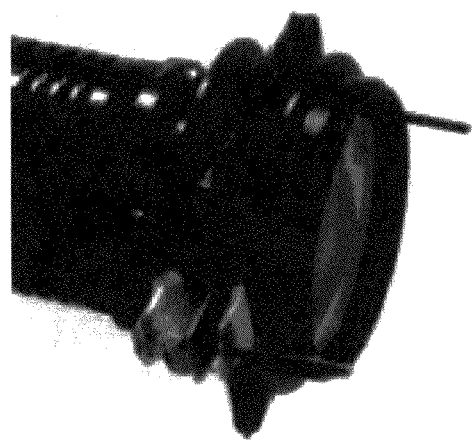
FIG. 12 shows a natural water cooling mechanism of the light source.

Natural cooling. We attach the polarizer 40 and the diffuser 50 to the light source, with a gap between the light source and the two filters (see FIG. 12). The surrounding medium can fill-in the gaps, providing natural cooling to the system.

Light recycling. A standard polarizer 40 usually transmits only half (or less) of the light intensity. We suggest using devices that convert a larger proportion of the energy into polarized light. This can be done using polarizing beam-splitters and retarders. It can also be done using wire-grid polarizers 40, which reflect the unpolarized light back into the light source reflector. Then, the light not transmitted to the scene is recycled. This way, the illumination in the scattering media is efficiently made polarized.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. An imaging method for recovering object visibility in a scene containing a scattering medium, said method comprising the steps of:
   (i) illuminating the scene with an active illumination system on which a polarizer is mounted;
   (ii) acquiring a first frame of the scene with an image acquisition equipment comprising a polarization analyzer;
   (iii) acquiring one or more additional polarized frames of the scene in a different polarization state of the polarizer or of the polarization analyzer or of both, or acquiring one or more additional unpolarized frames of the scene;

(iv) estimating the degree of polarization of backscatter in every point of said scene; and using a combination of all or part of the frames from (i)-(iii) and the analysis performed in (iv) to obtain one or more enhanced images with improved contrast and brightness range across the field of view.

2. An imaging method according to claim 1, wherein said one or more additional frames of the scene are acquired with the polarizer or the polarization analyzer in a polarization state with approximately maximum or high visible backscatter; or wherein said first frame of the scene is acquired with the polarizer or the polarization analyzer in a polarization state with approximately minimum or low visible backscatter; or both.

3. An imaging method according to claim 1, further compensating for signal attenuation.

4. An imaging method according to claim 1, wherein said enhanced image is further combined with one or more images obtained by any method adapted for enhancing images of polarizing objects.

5. An imaging method according to claim 1, wherein said active illumination system comprises at least one of the following:

(i) a multi-polarized light source composed of a polarized array of light sources so that at least one portion of the light sources are polarized in a different polarization state compared to the polarization state of the remaining light sources, and at least two frames are acquired using different polarization of the illumination;

(ii) one or more optical filters attached to a light source with a gap between said light source and the polarizer and analyzer so that the surrounding medium can fill in the gaps, providing natural cooling to the system;

(iii) one or more devices that convert more than half the energy into polarized light ;or (iv) a polarization analyzer is mounted on part or all of the pixels of an imaging sensor, so that the polarization analyzer mounted on one portion of the pixels is in one polarization state and the polarization analyzer mounted on the remaining pixels of said imaging sensor is in one or more different polarization states.

6. An imaging method according to claim 1, further estimating the distances between objects in said scene or further estimating and compensating for falloff or both.

7. An imaging method according to claim 1, wherein said one or more additional frames of the scene are acquired without mounting a polarization analyzer on said image acquisition equipment.

8. An imaging method for recovering object visibility of an object immersed in a scattering medium scene, said method comprising the steps of:

(i) illuminating a scene in a scattering medium using an illumination system, wherein said scattering medium comprises water, fog or biological tissues;

(ii) acquiring a first frame of the scene with an image acquisition equipment;

(iii) acquiring a second frame of either:
an illuminated void region in said scene, with no objects in sight;
a black object in said scene; or
a computer simulation of the backscatter value at each pixel based on knowledge of the scene structure or an equivalent analytical calculation; and (iv) subtracting a portion or all of the second frame from the first frame to obtain an enhanced image with improved contrast and brightness range across the field of view.

9. An imaging method according to claim 8, wherein said first frame is of a scene containing objects with distances larger than the effective backscatter saturation distance and said second frame is of an illuminated void region in said scene, with no objects in sight or of a computer simulation of the backscatter value at each pixel based on knowledge of the scene structure or an equivalent analytical calculation.

10. An imaging system for recovering object visibility in a scene containing a scattering medium, said system comprising:

(i) means for illuminating the scene with an active illumination system on which a polarizer is mounted;

(ii) means for mounting a polarization analyzer on an image acquisition equipment;

(iii) means for acquiring a first frame of the scene;

(iv) means for changing the polarization state of the polarizer or of the polarization analyzer or of both;

(v) means for acquiring one or more additional polarized or unpolarized frames of the scene;

(vi) means for estimating the degree of polarization of backscatter in every point of said scene;

(vii) means for estimating the backscatter in every point of said scene based on the analysis performed in (vi); and (viii) means for deducting a portion or all of the value of said backscatter in each point of said scene to obtain one or more enhanced images with improved contrast and brightness range across the field of view.

11. An imaging system for recovering object visibility of an object immersed in a scattering medium scene, said system comprising:

(i) means for illuminating a scene in a scattering medium using an illumination system, wherein said scattering medium comprises water, fog or biological tissues;

(ii) means for acquiring a first frame of the scene with an image acquisition equipment;

(iii) means for acquiring a second frame of either:
an illuminated void region in said scene, with no objects in sight;
a black object in said scene; or
a computer simulation of the backscatter value at each pixel based on knowledge of the scene structure or an equivalent analytical calculation; and (iv) means for subtracting a portion or all of the second frame from the first frame to obtain an enhanced image with improved contrast and brightness range across the field of view.

* * * * *